United States Patent
Al-Shibl

(10) Patent No.: US 9,932,959 B2
(45) Date of Patent: Apr. 3, 2018

(54) SHROUDED WIND TURBINE CONFIGURATION WITH NOZZLE AUGMENTED DIFFUSER

(75) Inventor: Khalid M. H. Al-Shibl, Riyadh (SA)

(73) Assignee: KING ABDULAZIZ CITY FOR SCIENCE AND TECHNOLOGY, Riyadh (SA)

(*) Notice: Subject to any disclaimer, the term of this patent is extended or adjusted under 35 U.S.C. 154(b) by 1277 days.

(21) Appl. No.: 13/417,764

(22) Filed: Mar. 12, 2012

(65) Prior Publication Data
US 2012/0230810 A1  Sep. 13, 2012

Related U.S. Application Data

(60) Provisional application No. 61/451,147, filed on Mar. 10, 2011.

(51) Int. Cl.
F03D 1/04 (2006.01)

(52) U.S. Cl.
CPC .......... *F03D 1/04* (2013.01); *F05B 2240/133* (2013.01); *F05B 2260/601* (2013.01); *Y02E 10/72* (2013.01); *Y10T 29/49229* (2015.01)

(58) Field of Classification Search
CPC ................................. F03D 1/04; F03D 11/04
USPC .............. 290/44, 55; 415/1, 182.1, 207, 227
See application file for complete search history.

(56) References Cited

U.S. PATENT DOCUMENTS

| | | | |
|---|---|---|---|
| 3,476,578 A | 11/1969 | Brinckman | |
| 3,514,310 A | 5/1970 | Kimura et al. | |
| 3,609,093 A | 9/1971 | Harrah | |
| 3,640,821 A | 2/1972 | Fischer et al. | |
| 3,787,687 A | 1/1974 | Trumble | |
| 3,789,425 A | 1/1974 | Matsushima | |
| 3,792,481 A | 2/1974 | Nagashima et al. | |
| 3,819,516 A | 6/1974 | Bailey et al. | |
| 3,855,928 A | 12/1974 | Kinney et al. | |

(Continued)

FOREIGN PATENT DOCUMENTS

| | | | |
|---|---|---|---|
| CN | 102823783 A | 12/2012 | |
| EP | 2360699 A2 | 8/2011 | |

(Continued)

OTHER PUBLICATIONS

"Oxidation of 2,4-dichlorophenoxyacetic acid by ionizing radiation: degradation, detoxification and mineralization", ScienceDirect, Feb. 2003 by Robert Zona et al. (p. 1) http://www.sciencedirect.com/science/article/pii/S0969806X02003304.

(Continued)

*Primary Examiner* — Sean J Younger
(74) *Attorney, Agent, or Firm* — Raj Abhyanker, P.C.

(57) ABSTRACT

Disclosed are a system, a method and an apparatus of diffuser nozzle augmented wind turbine. In one embodiment, a method includes attaching a nozzle with a streamlined opening to a diffuser to direct an air flow into a wind turbine. In addition, the method includes increasing a wind speed approaching a set of turbine blades within a shrouded wind turbine configuration. The method also includes recirculating the air within the shroud configuration to increase an output power generated through the wind turbine. The system is composed of diffuser and nozzle integrated and non-integrated with and without a flange. In one embodiment, a method includes increasing a pressure differential of a wind turbine.

2 Claims, 9 Drawing Sheets

(56) References Cited

U.S. PATENT DOCUMENTS

| | | | |
|---|---|---|---|
| 3,883,750 A * | 5/1975 | Uzzell, Jr. | 290/55 |
| 3,887,374 A | 6/1975 | Brongo et al. | |
| 3,936,361 A | 2/1976 | Takatori et al. | |
| 4,012,292 A | 3/1977 | Fujiwara et al. | |
| 4,021,135 A | 5/1977 | Pedersen et al. | |
| 4,025,220 A * | 5/1977 | Thompson et al. | 415/7 |
| 4,075,500 A | 2/1978 | Oman et al. | |
| 4,080,100 A * | 3/1978 | McNeese | 416/189 |
| 4,106,939 A | 8/1978 | Chang et al. | |
| 4,166,596 A * | 9/1979 | Mouton et al. | 244/30 |
| 4,199,615 A | 4/1980 | Wacks et al. | |
| 4,256,435 A | 3/1981 | Eckel | |
| 4,258,271 A * | 3/1981 | Chappell et al. | 290/54 |
| 4,285,481 A | 8/1981 | Biscomb | |
| 4,382,865 A | 5/1983 | Sweeny | |
| 4,457,666 A | 7/1984 | Selman, Jr. | |
| 4,482,290 A | 11/1984 | Foreman et al. | |
| 4,488,158 A | 12/1984 | Wirnowski | |
| 4,569,769 A | 2/1986 | Walton et al. | |
| 4,585,753 A | 4/1986 | Scott et al. | |
| 4,591,443 A | 5/1986 | Brown et al. | |
| 4,684,316 A | 8/1987 | Karlsson | |
| 5,098,806 A | 3/1992 | Robillard | |
| 5,232,484 A | 8/1993 | Pignatello | |
| 5,364,645 A | 11/1994 | Lagunas-Solar et al. | |
| 5,447,639 A | 9/1995 | Sivavec | |
| 5,599,172 A * | 2/1997 | McCabe | 417/334 |
| 5,618,427 A | 4/1997 | Seech et al. | |
| 5,663,475 A | 9/1997 | Elgal | |
| 5,702,587 A | 12/1997 | Clifford et al. | |
| 5,716,528 A | 2/1998 | Jasim et al. | |
| 6,160,194 A | 12/2000 | Pignatello | |
| 6,207,073 B1 | 3/2001 | Wolfe et al. | |
| 6,214,607 B1 | 4/2001 | Logan | |
| 6,246,126 B1 * | 6/2001 | Van Der Veken et al. | 290/55 |
| 6,382,904 B1 * | 5/2002 | Orlov et al. | 415/4.5 |
| 6,621,086 B1 | 9/2003 | Appleby | |
| 6,756,696 B2 * | 6/2004 | Ohya et al. | 290/55 |
| 7,018,166 B2 * | 3/2006 | Gaskell | 415/4.3 |
| 7,098,463 B2 | 8/2006 | Adamovics | |
| 7,147,428 B2 * | 12/2006 | Lamont | 415/1 |
| 7,172,386 B2 * | 2/2007 | Truong et al. | 415/4.1 |
| 7,218,011 B2 | 5/2007 | Hiel et al. | |
| 7,476,874 B2 | 1/2009 | Patel | |
| 7,484,363 B2 * | 2/2009 | Reidy et al. | 60/398 |
| 7,585,826 B2 | 9/2009 | Hwu et al. | |
| 7,750,317 B2 | 7/2010 | Djouider et al. | |
| 7,808,149 B2 | 10/2010 | Pabst et al. | |
| 7,928,594 B2 | 4/2011 | Shreider et al. | |
| 7,955,682 B2 | 6/2011 | Gore | |
| 8,089,173 B2 | 1/2012 | Freda | |
| 8,115,182 B1 | 2/2012 | Patel | |
| 8,137,052 B1 | 3/2012 | Schlegel | |
| 8,163,692 B2 | 4/2012 | Awasthi et al. | |
| 8,536,443 B2 | 9/2013 | Li et al. | |
| 8,586,665 B2 | 11/2013 | Basfar et al. | |
| 8,657,572 B2 | 2/2014 | Presz, Jr. et al. | |
| 8,794,903 B2 | 8/2014 | Fedor et al. | |
| 8,872,134 B2 | 10/2014 | Patel | |
| 2002/0028255 A1 | 3/2002 | Colegate et al. | |
| 2004/0211917 A1 | 10/2004 | Adamovics | |
| 2005/0002783 A1 | 1/2005 | Hiel et al. | |
| 2005/0208290 A1 | 9/2005 | Patel | |
| 2006/0145091 A1 | 7/2006 | Patel | |
| 2007/0281046 A1 | 12/2007 | Wen et al. | |
| 2008/0061559 A1 | 3/2008 | Hirshberg | |
| 2008/0124661 A1 | 5/2008 | Gore | |
| 2008/0150292 A1 | 6/2008 | Fedor et al. | |
| 2008/0176978 A1 | 7/2008 | Nodera | |
| 2008/0232957 A1 * | 9/2008 | Presz et al. | 415/191 |
| 2008/0296901 A1 * | 12/2008 | Liu | 290/55 |
| 2009/0097964 A1 * | 4/2009 | Presz et al. | 415/116 |
| 2009/0107919 A1 | 4/2009 | Burba, III et al. | |
| 2009/0230691 A1 * | 9/2009 | Presz et al. | 290/55 |
| 2009/0280009 A1 * | 11/2009 | Brock | 415/208.2 |
| 2010/0090473 A1 | 4/2010 | Glass | |
| 2010/0168498 A1 | 7/2010 | Burba, III et al. | |
| 2010/0282302 A1 | 11/2010 | Li et al. | |
| 2010/0308595 A1 * | 12/2010 | Chen | 290/55 |
| 2011/0042952 A1 * | 2/2011 | Ohya et al. | 290/52 |
| 2011/0058937 A1 | 3/2011 | Presz, Jr. et al. | |
| 2011/0144244 A1 | 6/2011 | Lee | |
| 2011/0189006 A1 | 8/2011 | Churchill et al. | |
| 2011/0266802 A1 | 11/2011 | Rehman Alvi | |
| 2012/0057974 A1 | 3/2012 | Freda | |
| 2012/0086216 A1 | 4/2012 | Ohya et al. | |
| 2012/0104759 A1 | 5/2012 | Ricker | |
| 2012/0175882 A1 | 7/2012 | Sterling et al. | |
| 2012/0181453 A1 | 7/2012 | Patel | |
| 2012/0183387 A1 | 7/2012 | Fedor et al. | |
| 2012/0228963 A1 | 9/2012 | Ursu et al. | |
| 2012/0285893 A1 | 11/2012 | Moore et al. | |
| 2013/0178572 A1 | 7/2013 | Basfar et al. | |
| 2014/0038305 A1 | 2/2014 | Andrey Sharavara et al. | |

FOREIGN PATENT DOCUMENTS

| | | | |
|---|---|---|---|
| WO | 2000029070 A1 | 5/2000 | |
| WO | 2004017095 A2 | 2/2004 | |
| WO | 2004077097 A2 | 9/2004 | |
| WO | 2004079393 A2 | 9/2004 | |
| WO | 2006065248 A2 | 6/2006 | |
| WO | 2009119942 A1 | 10/2009 | |
| WO | 2009130730 A1 | 10/2009 | |
| WO | 2012026840 A1 | 3/2012 | |
| WO | 2012154965 A1 | 11/2012 | |
| WO | 2012159012 A1 | 11/2012 | |
| WO | 2013095178 A1 | 6/2013 | |
| WO | 2013106277 A1 | 7/2013 | |

OTHER PUBLICATIONS

"Radiolytic degradation of malathion and lindane in aqueous solutions", Radiation Physics and Chemistry, vol. 78, Issue 11, Nov. 2009 by K. A. Mohamed et al. (p. 1) http://www.sciencedirect.com/science/article/pii/S0969806X0900245X.

"Gamma-ray induced degradation of diazinon and atrazine in natural groundwaters", Journal of Hazardous Materials, vol. 166, Issues 2-3, Jul. 2009 by K. A. Mohamed et al. (p. 1) http://www.sciencedirect.com/science/article/pii/S0304389408017846.

"Dosimetry characteristics of the nitro blue tetrazolium-polyvinylalcohol film for high dose applications", Radiation Physics and Chemistry, vol. 68, Issue 6, Dec. 2003 by A Moussa et al. (p. 1) http://www.sciencedirect.com/science/article/pii/S0969806X03005152.

"Polymer-based triphenyl tetrazolium chloride films for ultraviolet radiation monitoring", Radiation Physics and Chemistry, vol. 57, Issue 2, Feb. 2000 by S. Ebraheem et al. (p. 1) http://www.sciencedirect.com/science/article/pii/S0969806X99003527.

"A Shrouded Wind Turbine Generating High Output Power With Wind-lens Technology", energies 2010 by Yuji Ohya et al. (pp. 16).

"Effects of ionizing radiation on pesticides in a food irradiation perspective: a bibliographic review", Journal of Agricultural and Food Chemistry, Dec. 1991 by Francois L. Lepine (p. 1) http://pubs.acs.org/doi/abs/10.1021/jf00012a002.

"Food irradiation studies at the Institute of Nuclear Energy Research, Taiwan, Rep. of China", Radiation Physics and Chemistry (1977),vol. 18, Issues 3-4, 1981 by Ying-Kai Fu et al. (p. 1) http://www.sciencedirect.com/science/article/pii/0146572481901758.

"Monitoring of toxicity during degradation of selected pesticides using ionizing radiation", Chemosphere, vol. 57, Issue 2, Oct. 2004 by Przemyslaw Drzewicz et al. (p. 1) http://www.sciencedirect.com/science/article/pii/S0045653504004060.

"Decomposotion of Aldrin by Gamma Radiation II. In Lipid Solutions", Jun. 1972 by A. E. Carp et al. (p. 2) http://link.springer.com/article/10.1007%2FBF01684456?LI=true#close.

"Using gamma irradiation for the recovery of anthocyanins from grape pomace", Radiation Physics and Chemistry, vol. 57, Issues

(56) References Cited

OTHER PUBLICATIONS 3-6, Mar. 2000 by N Ayed et al. (p. 1) http://www.sciencedirect.com/science/article/pii/S0969806X99003928.
"Studies on sprout inhibition of potatoes and onions and shelf-life extension of dates in Iraq", Radiation Physics and Chemistry vol. 14, Issues 3-6, 1979 by H. Auda et al. (p. 1) http://www.sciencedirect.com/science/article/pii/0146572479901134.
"Effect of gamma irradiation on storability of two cultivars of Syrian grapes (*Vitis vinifera*)", Radiation Physics and Chemistry, vol. 55, Issue 1, Jun. 1, 1999 by M. Al-Bachira (p. 1) http://www.sciencedirect.com/science/article/pii/S0969806X98002953.
"Use of tetrazolium salts in dosimetry of ionizing radiation", Radiation Physics and Chemistry, vol. 52, Issues 1-6, Jun. 1998 by A.K.Pikaev et al. (p. 1) http://www.sciencedirect.com/science/article/pii/S0969806X98000942.
"De-contamination of pesticide residues in food by ionizing radiation", Radiation Physics and Chemistry, vol. 81, Issue 4, Apr. 2012 by Ahmed A. Basfar et al. (p. 1) http://www.sciencedirect.com/science/article/pii/S0969806X11005226.
"Radiation induced degradation of dyes—An overview", Journal of Hazardous Materials, vol. 166, Issue 1, Jul. 15, 2009 by M.A. Rauf et al. (p. 1) http://www.sciencedirect.com/science/article/pii/S030438940801724X.
"Physical properties of electron beam irradiated poly(vinyl butyral) composites with carbamate, imidazole, and tetrazolium dye", Journal of Applied Polymer Science, vol. 101 Issue 6, Sep. 15, 2006 by Hossam M. Said et al. (p. 1).

* cited by examiner

US 9,932,959 B2

SHROUDED WIND TURBINE CONFIGURATION WITH NOZZLE AUGMENTED DIFFUSER

PRIOR APPLICATIONS

This application claims priority to a provisional application 61/451,147 entitled DIFFUSER NOZZLE AUGMENTED WIND TURBINE filed on Mar. 10, 2011.

FIELD OF TECHNOLOGY

This disclosure relates generally to a technical field of turbines and, in one example embodiment, to a system, method and an apparatus of diffuser nozzle augmented wind turbine.

BACKGROUND

Wind energy may be used to power ships, mills, pumps or generators. The best known of these machines may be the propeller drive with two, three or more blades mounted vertically on top of a pillar, with the possibility of turning in the direction of the wind action.

However, all of these devices may operate in the free stream of the wind. Wind turbines may be used for the generation of electrical energy. In a typical form, a multi-blade turbine may be rotatably mounted on a support such as a pole or tower to be driven by surface wind, the turbine in turn driving an electrical generator coupled, for example, to electrical utility lines. The turbine may be rotated about a vertical axis of the pole or tower to compensate for shifts in wind direction. Diffusers may be used to increase the power output of converting wind energy to electrical energy. The disadvantage with such wind turbines may be that the magnitude of the energy produced in relation to the size of a plant is relatively small. A highly optimized diffuser may be needed to optimize the output of energy.

SUMMARY

Disclosed are a system, a method and an apparatus of diffuser nozzle augmented wind turbine. In one aspect, a method includes attaching a nozzle with a streamlined nozzle opening to a diffuser such that the nozzle spans the entire length of the diffuser to direct an air flow through the streamlined nozzle opening into a wind turbine. The method also includes increasing a wind speed approaching a set of turbine blades within a shrouded wind turbine configuration. The method further includes inducing a recirculation of the air contained within the shroud configuration such that there is near the diffuser inlet an inward flow direction from the nozzle to the diffuser that interact and direct the air flow into the wind turbine. The diffuser may be flanged.

In another aspect, a system includes a diffuser to collect and accelerate an air flow to a set of turbine blades within a shrouded wind turbine configuration. The diffuser increases a wind speed approaching the set of turbine blades and also increases an output power generated. The system also includes a nozzle with a streamlined nozzle opening to direct the air flow into the set of turbine blades and induces a recirculation within the shroud configuration that interacts and directs the air flow approaching the wind turbine shroud into the set of turbine blades. The nozzle with the streamlined nozzle opening also increases the wind speed approaching the set of turbine blades and the output power.

In yet another aspect, a method includes increasing a pressure differential between an entrance and an exit of a shrouded wind turbine configuration to draw an air flow through a diffuser of the shrouded wind turbine configuration. The method also includes directing the air flow into the diffuser through a nozzle with a streamlined nozzle opening attached to the diffuser. The method further includes recirculating the air within the shrouded wind turbine configuration to increase a wind speed of the air flow approaching a wind turbine in the diffuser.

Furthermore, the method may include concentrating the air flow approaching the wind turbine through the nozzle to induce a recirculation of the air flow. The method may also include creating a low pressure region by vortex formation through a flange at the outer periphery of the exit of the diffuser. In addition, the method may include restraining a separation of the air flow at the entrance of the diffuser through an inlet shroud. The method may also include modifying the architecture of the nozzle to form a high pressure zone within the nozzle to induce a directed recirculation of the air flow approaching the wind turbine.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Disclosed are a system, a method and an apparatus of induced and directed recirculation of air in a shrouded wind turbine configuration. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
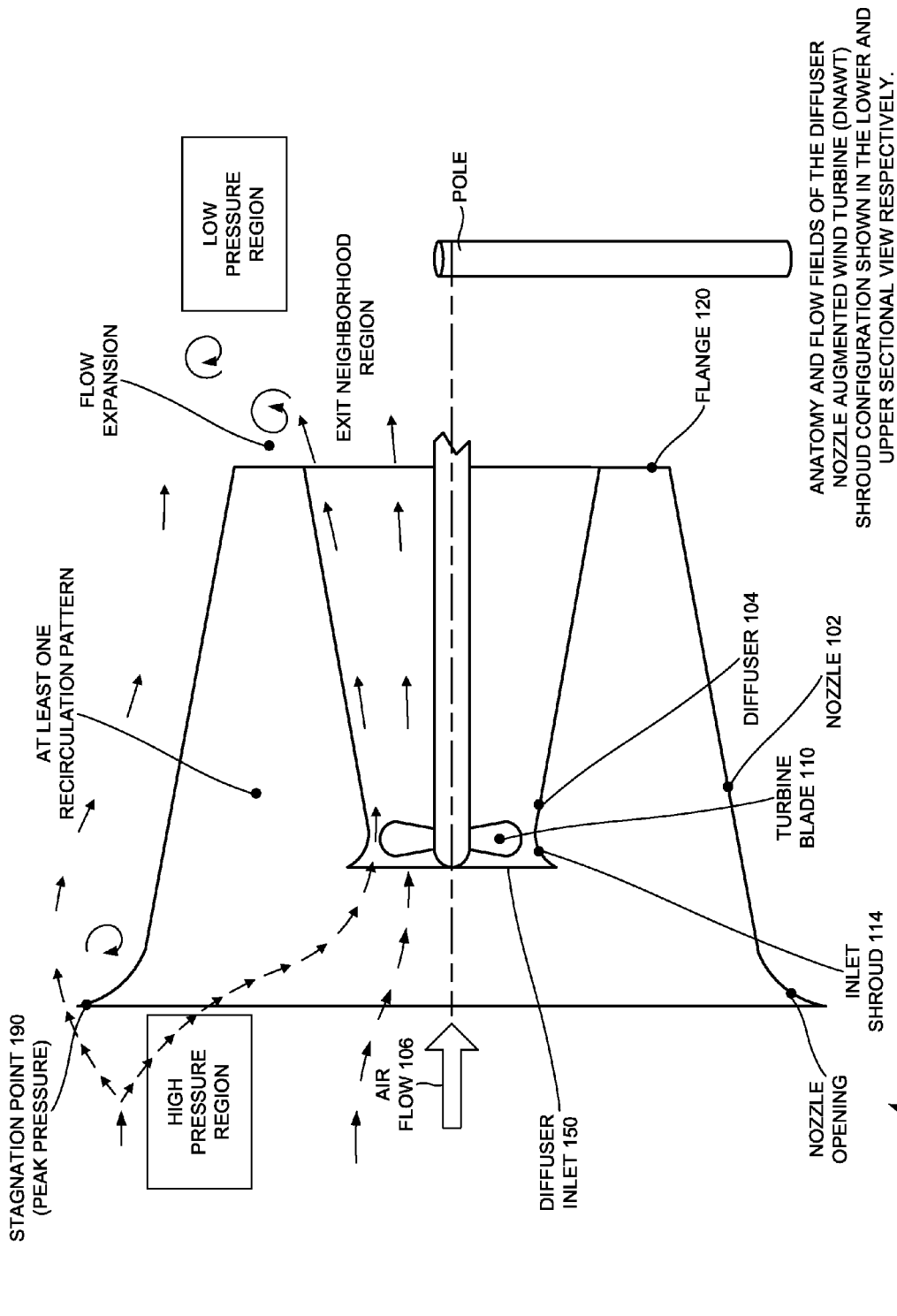
FIG. 1 is a schematic cross sectional view of a shrouded wind turbine, according to one or more embodiments.

FIG. 1 is a cross sectional view 100 of a shrouded wind turbine, according to one or more embodiments. In one or more embodiments, the shrouded wind turbine may include a nozzle 102 with a streamlined nozzle opening and a diffuser with a diffuser inlet 150. The diffuser inlet may lead to turbine blades 110. In one or more embodiments, the nozzle that may be an outer covering that spans the entire length of the diffuser may be attached to a diffuser as show in FIG. 1. In one or more embodiments the nozzle may be longer than the length of the diffuser. In one or more embodiments, the purpose of the nozzle may be to draw in air and to create a high pressure region inside the wind turbine in the region between the nozzle and the diffuser. In one or more embodiments, the addition of the nozzle to the diffuser may create a shrouded wind turbine. The diffuser 104 may provide greater output power at the expense of weight and brink. In one or more embodiments, the nozzle 102 may draw the air flow 106 from outside the shrouded wind turbine into the diffuser of the shrouded wind turbine. In one or more embodiments, the diffuser 104 may collect the air and accelerate the air flow 106 to a set of turbine blades 110 of the diffuser. Furthermore, the diffuser 104 may increase air flow 106 approaching the turbine blade 110 in a high pressure region of the shrouded wind turbine configuration and create a rapid mixed vortex of air in the low pressure region of the shrouded wind turbine configuration. In one or more embodiments, the stagnation point at the edge of the nozzle as illustrated by FIG. 1 may be a high pressure region, while the area near the flange may be a low pressure region. This pressure differential between the high pressure region and the low pressure region may push in the air flow into the wind turbine. This acceleration of the air flow 106 may in turn increase the speed of the turbine blades and thus increase an output power of the diffuser. The magnitude of the power output is proportional to the approaching air speed by a power law of order three. A known method to influence and increase the speed of a free air stream is through the use of venturi effect in which a nozzle diffuser arrangement is used to influence the speed and the pressure of the flow. In one or more embodiments, the shrouded wind turbine may include a stagnation point that may be susceptible to a peak pressure that may be at the very tip of the nozzle. The area of the wind turbine around the stagnation point might be a high pressure region while the area on the other side of the diffuser as shown in the diagram may be a low pressure region. In one or more embodiments, they may be nozzle points on the wind turbine.

In one or more embodiments, the high pressure region within the shrouded wind turbine configuration (in between the nozzle and the diffuser) may be created by modifying an architecture and placement of the nozzle 102. In one or more embodiments, a low pressure region may be generated in an exit neighborhood of the wind turbine by a flange 120. The exit neighborhood may be on the opposite side of the nozzle opening, as shown in the Figures. The flange 120 may be at an exit periphery of the shrouded wind turbine configuration. A diffuser nozzle augmented wind turbine may have a duct that surrounds the wind turbine blades 110 and increases in cross-sectional area in the stream wise direction. The resulting sub-atmospheric pressure within the shrouded wind turbine 104 draws more air through the blade 110 plane, and hence more power may be generated compared to a "bare turbine" of the same rotor blade diameter.

In one or more embodiments, the flange 120 may draw more air flow 106 through the set of turbine blades 110 inside the diffuser 104 through the creation of the lower pressure region in the exit neighborhood of the diffuser 104. Furthermore, the pressure differential within the shrouded wind turbine configuration may be enhanced through the nozzle 102 attached to the diffuser 104. In one or more embodiments, the pressure differential created within the shrouded wind turbine configuration may accelerate the wind speed approaching the set of turbine blades 110, thus, increasing the generated output power from the shrouded wind turbine configuration. In one or more embodiments, an inlet shroud 114 may be added at the entrance (diffuser inlet 150) of the diffuser 104. The inlet shroud allows the wind to flow into the diffuser 104 easily. In one or more embodiments, the shrouded wind turbine of FIG. 1 may reduce mechanical losses and inefficiencies of the wind turbine and may also reduce noise generated by the wind turbine.

In one or more embodiments, the shrouded wind turbine may be mounted on a pole (not shown). In one or more embodiments, the shrouded wind turbine may be arranged on a tower. In one or more embodiments, the tower may assist in increasing the air flow 106 to the shrouded wind turbine. In one or more embodiments, the shrouded wind turbine may be placed on the tower to avoid the losses in air flow 106 due to obstacles that may decrease the wind shear effect that may be present closer to the ground.

In an example embodiment, the shrouded wind turbine may have a diffuser inlet inlet at the entrance of the diffuser and air outlet at an opposite end to an entry of the air flow 106. In one or embodiments, the structure may be a duct having two ends. In one or more embodiments, the duct may have an inlet end and an outlet end. In one or more embodiments, the duct may include the shrouded wind turbine. In one or more embodiments, the shrouded wind turbine may include a nozzle 102 and a diffuser 104. In one or more embodiments, the nozzle 102 may define a convergent air flow towards the low pressure region. In one or more embodiments, the diffuser 104 may be continuous with the nozzle 102

In an example embodiment, the turbine blade 110 may be supported in the shrouded wind turbine by a support member extending from the inner surface of the shrouded wind turbine. In one or more embodiments, a rotor may be attached to the turbine blade 110. In one or more embodiments, the turbine blade 110 may be a rotary shaft. An electric generator may be driven by the rotation of the rotor. In one or more embodiments, a plurality of wind elements may form the diffuser 104.

In another example embodiment, the diffuser 104 may have a plurality of slots formed therein. In one or more embodiments, the plurality of slots may be formed on the sides of the diffuser 104. In one or more embodiments, pressure inside the diffuser 104 may be recovered by supplying energy to the stream of air inside the diffuser 104. In one or more embodiments, the plurality of slots on the diffuser 104 may be relatively small in size in comparison to the size of the diffuser 104.

In yet another example embodiment, the plurality of slots and their small size may help in guiding outside air to the diffuser 104 with little pressure loss involved as the outside air is guided into the diffuser 104. Thus, the amount of energy supplied to the duct part of the shrouded wind turbine may increase. Therefore, velocity of air flowing into the shrouded wind turbine towards the turbine blade 110 may increase and enable the rotation of the turbine blade 110 at high speeds and thereby leading to an increase in the output of the shrouded wind turbine.

In an example embodiment, the shrouded wind turbine may have a means of adding external energy to the air flow 106. In one or more embodiments, air flow 106 may be towards the turbine blade 110. In one or more embodiments, the means of adding external energy may be dispersed in the diffuser 104 and/or inlet shroud 114. In one or more embodiments, the means of adding external energy may be a heating device. The heating device may be a heat pump, electric heater, heat sink, reversible-cycle heat pumps, devices using reversing valves, and/or optimized heat exchangers. In one or more embodiments, the heat pump may draw heat from the air and/or from the ground. In one or embodiments, the optimized heat exchangers may be used so that the direction of heat flow may be reversed. External energy addition may heat the air flow 106 towards the turbine blade 110 so the air flow 106 may recover an initial pressure before the air flow 106 reached an outlet of the shrouded wind turbine. Therefore, velocity of the air flow 106 may be increased leading to high speed rotation of the turbine blade 110 and thus resulting in an increase in the power output of the shrouded wind turbine.

In an example embodiment, the shrouded wind turbine may include an additional stationary part. The additional stationary part may deflect air flow 106 that is moving away from the turbine blade 110 towards the rotating direction of the turbine blade 110. In one or more embodiments, the additional stationary part may be a stator. The additional stationary part may deflect the direction of air flow 106 towards the turbine blade 110. Inclusion of the additional stationary part in the shrouded wind turbine may reduce the number of parts in the shrouded wind turbine and lead to increase in the output of the shrouded wind turbine. In one or more embodiments, the additional stationary parts may increase the velocity of the air flow 106 coming towards the diffuser inlet or rotor and/or turbine blade 110. Thus, may lead to increased output of the shrouded wind turbine.

Figure 2:
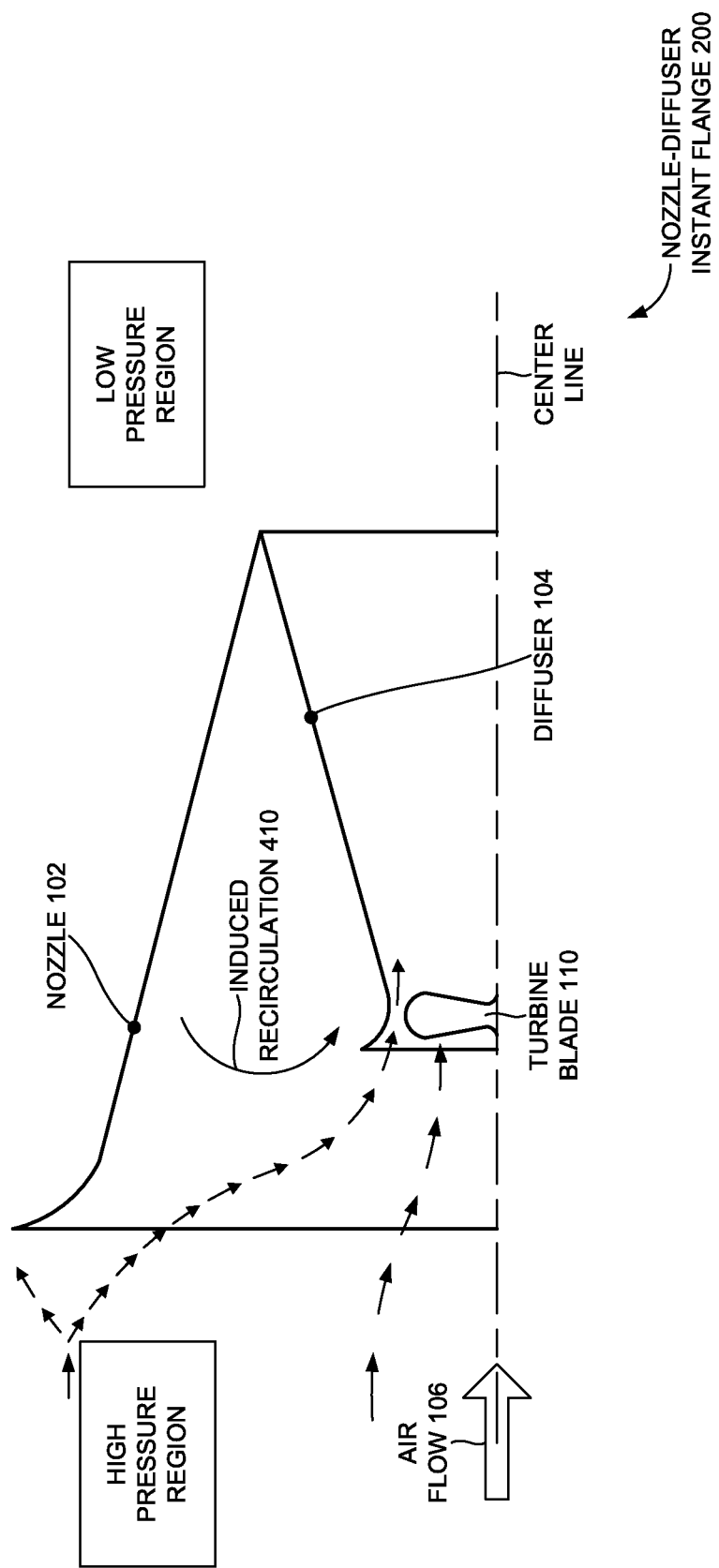
FIG. 2 is a schematic view of a nozzle-diffuser instant flange, according to one or more embodiments.

FIG. 2 is a schematic view of a nozzle-diffuser instant flange 200, according to one or more embodiments. FIG. 2 illustrates a different configuration in which the nozzle 102 may be integrated with the diffuser 104 such that the nozzle 102 spans the entire length of the diffuser 104, according to one or more embodiments. In one or more embodiments the flange is a minimum such that the nozzle is directly attached to the end of the diffuser creating an instant-flange. Also, in one or more embodiments, the integration of the nozzle 102 with the diffuser 104 may induce the recirculation of the air within the shrouded wind turbine configuration. In one or more embodiments, the pressure differential between the entrance and the exit of the shrouded wind turbine configuration may be increased to draw air flow 106 through the diffuser 104 of the shrouded wind turbine configuration.

In one or more embodiments, FIG. 2 shows half of the shrouded wind turbine configuration. In one or more embodiments, FIG. 2 illustrates one half of the shrouded wind turbine configuration, with the center line being an axis that splits the shrouded wind turbine configuration into two halves. In one or more embodiments, the air flow 106 may be directed into the diffuser 104 through the nozzle with a streamlined opening 102 attached to the diffuser 104. Also, in one or more embodiments, the air flow 106 may interact with the recirculation within the wind turbine shroud configuration and get directed towards the wind turbine in the diffuser 104 and gain an increase in the wind speed of the air flow 106 approaching the wind turbine in the diffuser 104. In one or more embodiments, attachment between the diffuser 104 and the nozzle 102 may have slits. In one or more embodiments, the slits may increase the circulation of the air within the shrouded wind turbine configuration. In one or more embodiments, the increase in circulation of the air within the shrouded wind turbine configuration may imply an increase in the velocity of the rotation of the turbine blade 110. In one or more embodiments, the increase in the velocity of the turbine blade 110 rotation may lead to an increase in the output of the shrouded wind turbine.

Figure 3:
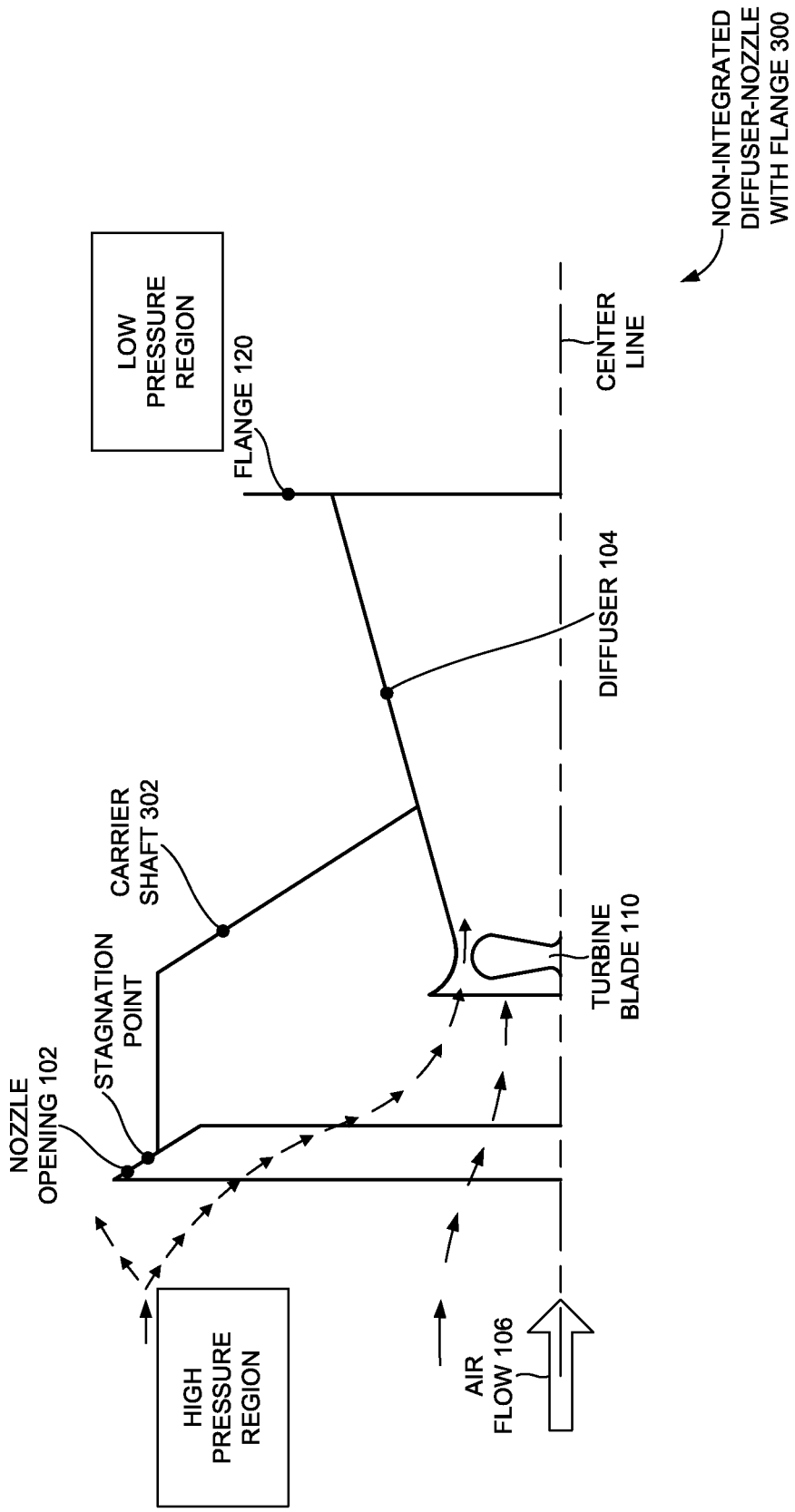
FIG. 3 is a schematic view of a non-integrated diffuser-nozzle with flange, according to one or more embodiments.

In one or more embodiments, the nozzle 102 may include a carrier shaft 302 to attach the nozzle 102 to the diffuser 104 without spanning the entire length of the diffuser 104 (as illustrated in FIG. 3). FIG. 3 is a schematic view of a non-integrated diffuser-nozzle with flange 300, according to one or more embodiments. The non-integrated diffuser-nozzle with flange 300 configuration also helps in altering the pressure and the recirculation of the air within the shrouded wind turbine configuration. With only the streamlined nozzle opening part from the nozzle in use with the diffuser, the recirculation may not be counted. In one or more embodiments, the pressure differential within the shrouded wind turbine configuration may be increased with the inclusion of a differential pressure device within the diffuser 104. In one or more embodiments, the increased pressure differential may draw in more air into the wind turbine and thus, increasing the power output of the shrouded wind turbine. In one or more embodiments, the wind turbine configuration of FIG. 3 may be included in a duct equipped wind power generator.

Figure 4:
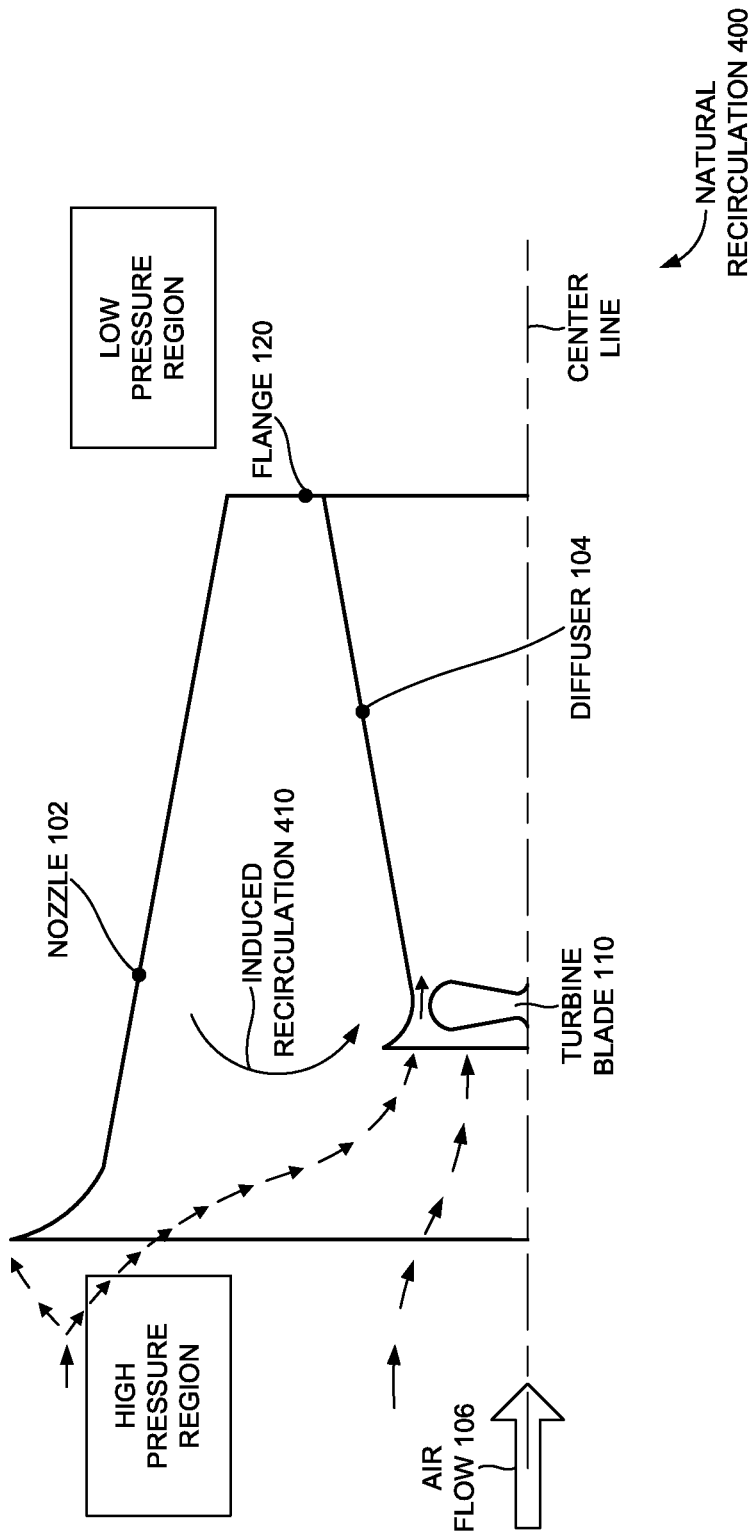
FIG. 4 is a schematic view of naturally induced recirculation, according to one or more embodiments.

FIG. 4 is a schematic view of natural recirculation 400 of the air flow 106, according to one or more embodiments. As illustrated in FIG. 4, the nozzle 102 spans the entire length of the diffuser 104 and attaches to the flange 120 associated with the diffuser. As shown in FIG. 4 illustrating the natural recirculation of air in the shrouded wind turbine, as the nozzle 102 spans the entire length of the diffuser 104, the air within the shrouded wind turbine configuration may travel along the entire length of the diffuser 104 thus, inducing recirculation 410 within the shrouded wind turbine configuration.

In one or more embodiments, the pressure differential within the shrouded wind turbine configuration may be increased to induce a greater recirculation of the air within the shrouded wind turbine configuration. In one or more embodiments, the pressure differential may be created due to the change and exchange of momentum for the nearby flow. In one or more embodiments, the pressure differential inside the shrouded wind turbine configuration may be increased using external source of energy. In one or more embodiments, external energy may be provided to the air flow 106. In one or more embodiments, the external energy may be provided in the form of heaters. The heaters may be included in the diffuser. In one or more embodiments, the heaters may increase the energy that the air flow 106 possesses. Thus, the increased energy of the air flow 106 in the form of external heat may lead to the increase in the pressure differential within the shrouded wind turbine configuration. The increased pressure differential in the wind turbine configuration may lead to the increase in the velocity of the air flow 106 that contacts the turbine blade 110. Thus, the increased velocity of the air flow 106 may in turn imply an increase in the output of the shrouded wind turbine configuration.

In one or more embodiments, the shrouded wind turbine configuration may be placed on a tower. In one or more embodiments, placing the wind turbine configuration on an elevated structure such as a tower may increase the free air velocity and amount of air flow 106 that contacts the turbine blade 110.

In one or more embodiments, the turbine blade 110 may be coupled with a rotor. The velocity of the air flow striking the turbine blade 110 may be converted to rotation of the turbine blade 110. Mechanical energy in the rotation of the turbine blade 110 may be converted into electrical energy by the rotor that is connected to the turbine blade 110.

In an example embodiment, the shrouded wind turbine configuration of FIG. 4 may include an additional stationary part along with the rotor. The additional stationary part may deflect air flow 106 that is moving away from the turbine blade 110 towards of the turbine blade 110. In one or more embodiments, the additional stationary part may be a stator. Inclusion of the additional stationary part in the shrouded wind turbine may reduce the number of parts in the shrouded wind turbine and lead to increase in the output of the shrouded wind turbine. In one or more embodiments, the additional stationary part may increase the velocity of the air flow 106 coming towards the rotor and/or turbine blade 110. Thus, leading to a possible increased output of the shrouded wind turbine.

In an example embodiment, the diffuser 104 may include a nozzle at the lower pressure end of the diffuser 104. In one or more embodiments, the nozzle at the low pressure end of the diffuser 104 may lead to an increase in the pressure differential in the shrouded wind turbine configuration. In one or more embodiments, the nozzle at the low pressure end of the diffuser 104 may lead to an expansion of air and a slower exit of the air from the shrouded wind turbine configuration. A slower exit of air from the shrouded wind turbine configuration may increase the pressure differential inside the shrouded wind turbine configuration. Increased pressure differential inside the shrouded wind turbine configuration may increase the power output of the shrouded wind turbine configuration.

In one or more embodiments, a wake in the shrouded wind turbine may lead to a pressure loss in the shrouded wind turbine configuration. In one or more embodiments, the wake created in the shrouded wind turbine configuration may be handled by including slits on the periphery of the diffuser 104. In one or more embodiments, the slits may be used to supply energy to the air flow 106 inside the diffuser 104 and thereby recover the pressure loss due to the wake.

In one or more embodiments, the diffuser 104 may be formed with multiple wing elements. In one or more embodiments, the multiple wing elements may be overlapped. In one or more embodiments, the overlapped elements may be arranged such that the adjacent edges of the wing elements are overlapped. In one or more embodiments, the overlapping of adjacent edges of the wing elements may create slits that are relatively small in length. In one or more embodiments, the relatively small slits may guide outside air with little pressure loss to recover the pressure loss due to the wake. Thus, energy supplied to the diffuser 104 and in turn the turbine blade 110 may increase the velocity of the air flow 106 that is flowing into the shrouded wind turbine configuration. The increase in the velocity of the air flow 106 may enable the turbine and/or rotor to rotate thus, leading to increased power output of the shrouded wind turbine configuration.

In one or more embodiments, overlapping arrangement of the wing elements that may form the diffuser 104. In one or more embodiments, the overlapping arrangement of the wing elements may provide a cost reduction as the slits may be formed easily without requiring precise machining operation.

In one or more embodiments, the overlapping arrangement of the wing elements that form the diffuser 104 may make the diffuser 104 readily adaptable to design modification without the need for replacement of the entire diffuser 104.

Figure 5A:
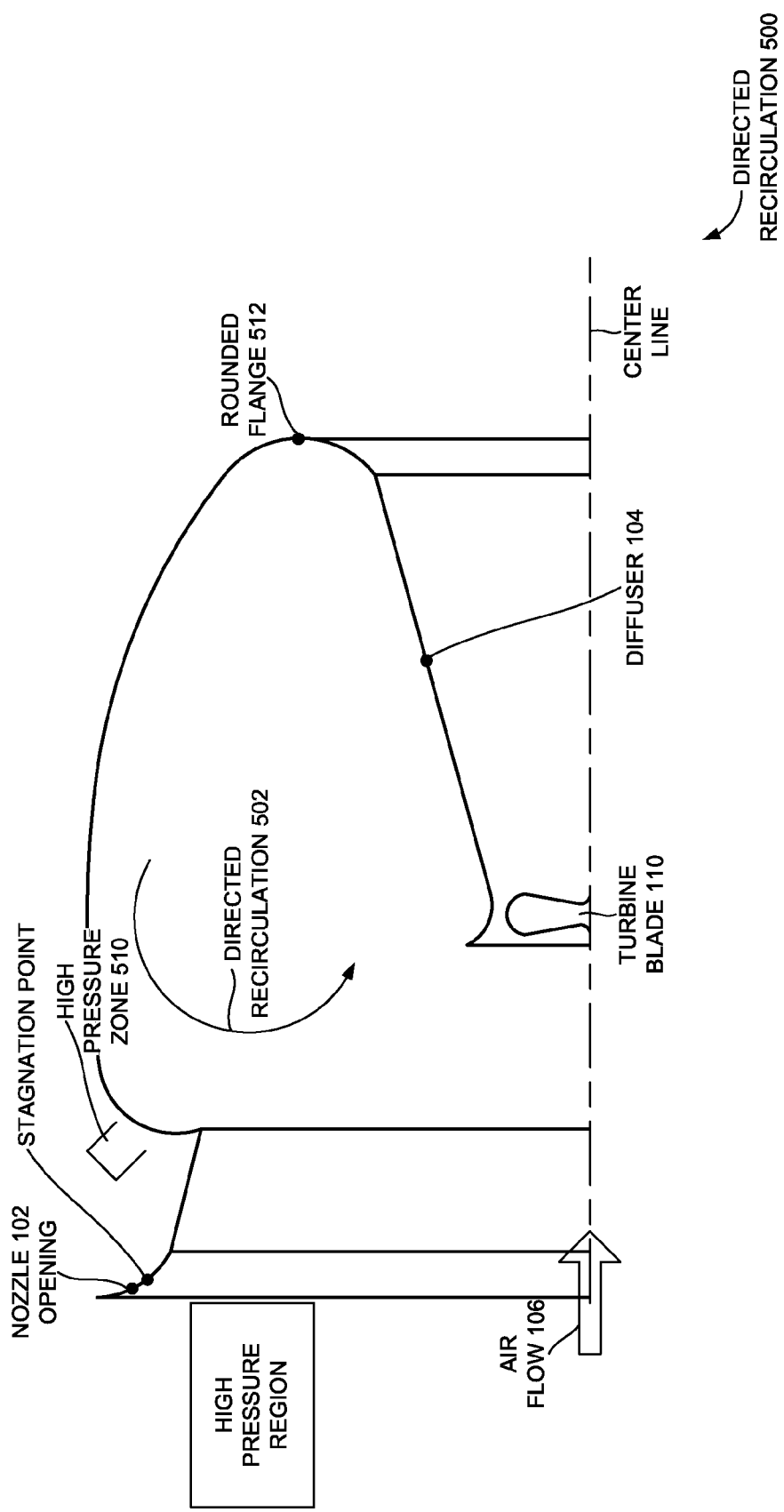
FIG. 5A and FIG. 5B are schematic views of directed recirculation, according to one or more embodiments.
Figure 5B:
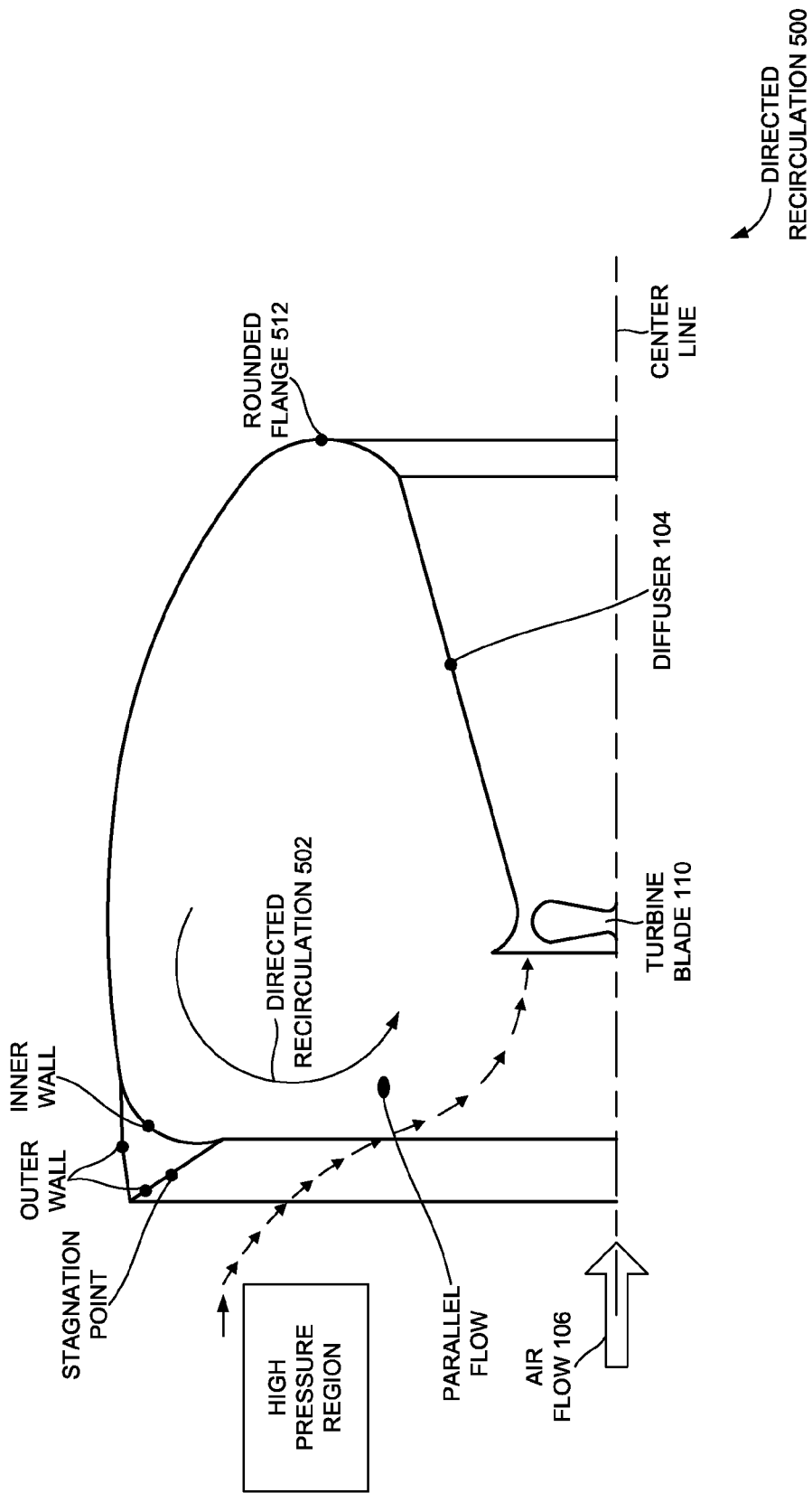

In one or more embodiments, the flange associated with the diffuser 104 may be rounded (as illustrated in FIG. 5A and FIG. 5B) to induce a directed recirculation of the air within the shrouded wind turbine configuration. Also, in one or more embodiments, a curved architecture of the nozzle 102 may induce the directed recirculation within the nozzle 102. Essentially, the flange may generate a low-pressure region in the exit neighborhood of the diffuser 104 by vortex formation and draws more mass flow to the wind turbine inside the diffuser 104 shroud.

In one or more embodiments, a high pressure zone 510 is created at the exterior of the rounded flange 512 associated with the diffuser 104. Also, in one or more embodiments, due to the high pressure zone 510 created by protruding the modified architecture above the tip of the streamlined nozzle opening to generate a high pressure zone may help resist the air flow away from the shroud area and may increase the flow into the wind turbine inlet.

In one or more embodiments, the diffuser nozzle augmented wind turbine configuration may involve increasing the power output from the wind turbine without increasing the radial distance of the rotating blades and allowing the wind turbine startup at a lower approaching wind speed. In addition, the shroud configuration may lower noise generation and a safer blade-tip interaction with the surroundings along the radial direction.

In one embodiment, a protective net is attached at or near the leading edge of the diffuser inlet or at or near the leading edge of the nozzle opening or at both of them to protect the flying birds from hitting the rotating blades and to add protection for the wind turbine components against flying objects.

Figure 6A:
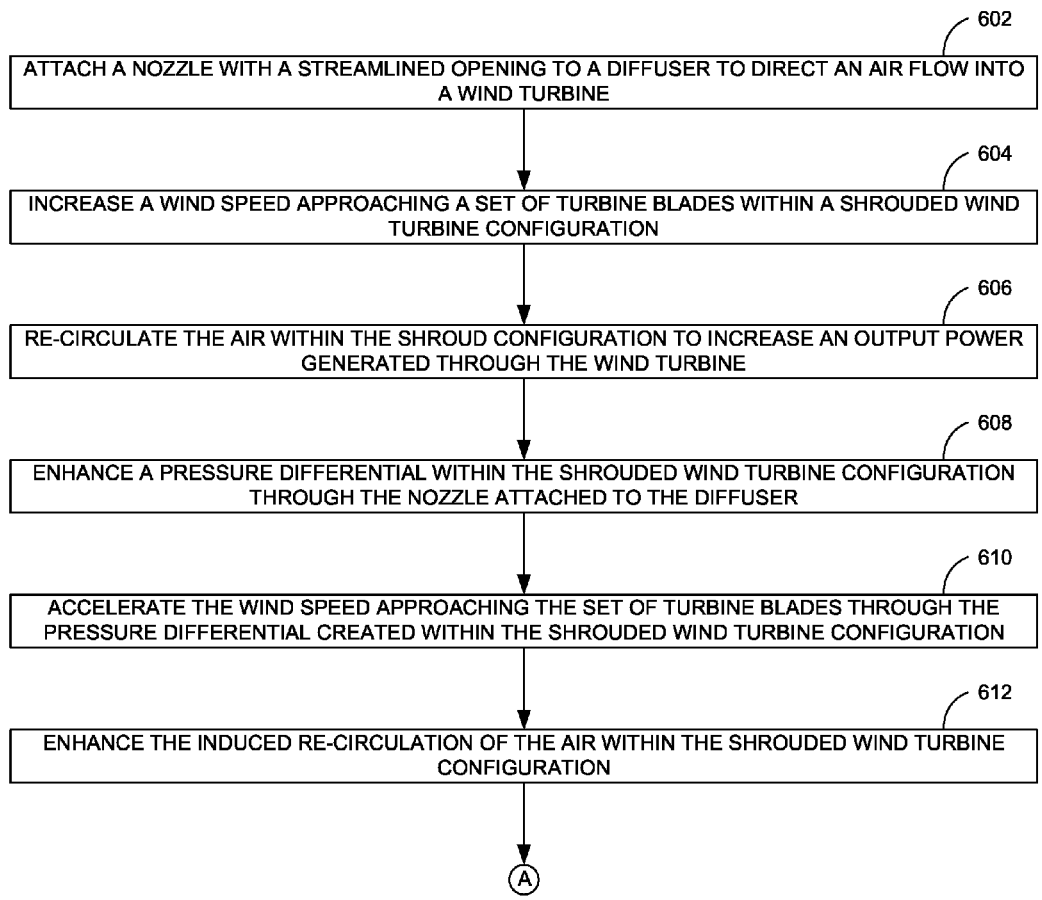
FIG. 6A and FIG. 6B are process flow diagrams illustrating air flow into a wind turbine, according to one or more embodiments.
Figure 6B:
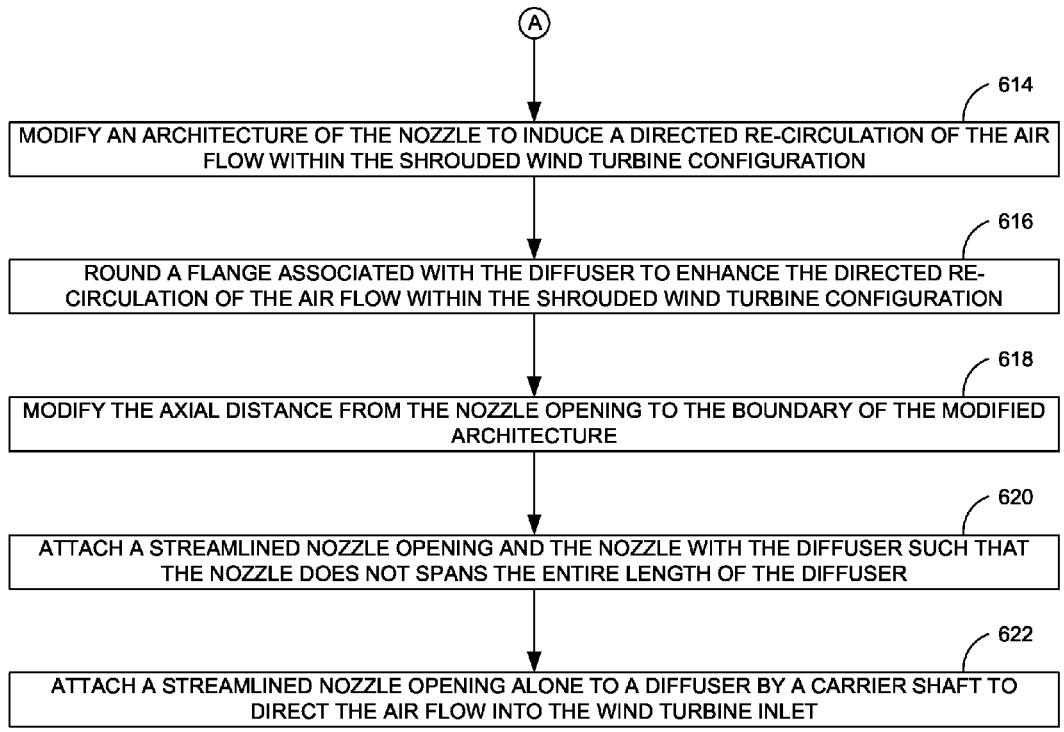

FIG. 6A and FIG. 6B is a process flow diagram illustrating air flow into a wind turbine, according to one or more embodiments. In one or more embodiments, in operation 602, a nozzle may be attached with a streamlined opening to a diffuser to direct air flow into a wind turbine. In one or more embodiments, in operation 604, a wind speed approaching a set of turbine blades within a shrouded wind turbine configuration may be increased. In one or more embodiments, in operation 606, the air within the shroud configuration may be re-circulated to increase an output power generated through the wind turbine. In one or more embodiments, in operation 608, a pressure differential within the shrouded wind turbine configuration may be enhanced through the nozzle attached to the diffuser.

In one or more embodiments, in operation 610, the wind speed approaching the set of turbine blades may be accelerated through the pressure differential created within the shrouded wind turbine configuration. In one or more embodiments, in operation 612, a recirculation of the air flow may be induced through the nozzle In one or more embodiments, in operation 618, architecture of the nozzle may be modified to induce the directed recirculation of the air within the shrouded wind turbine configuration.

In one or more embodiments, in operation 620, the flange associated with the diffuser may be rounded to enhance the directed recirculation of the air within the shrouded wind turbine configuration. In one or more embodiments, in operation 622, an axial distance from the nozzle opening to the boundary of the modified architecture may be modified to enhance the recirculation of the air flow. In one or more embodiments, in operation 624, the streamlined nozzle opening and the nozzle with the diffuser may be attached such that the nozzle does not span the entire length of the diffuser to alter the pressure and the recirculation within the shrouded wind turbine configuration. In one or more embodiments, in operation 626, a streamlined nozzle opening alone with a diffuser may be attached by a carrier shaft to direct the air flow into the wind turbine inlet in the diffuser without accounting for the recirculation within the shrouded wind turbine configuration. The streamlined nozzle opening alone or as a part of a nozzle is directing the air flow into the wind turbine by separating the air flow approaching the streamlined nozzle and buildup of a high pressure zone with a stagnation point take place along the edge of the nozzle opening with fraction of the separated flow depart into the wind turbine inlet.

Figure 7:
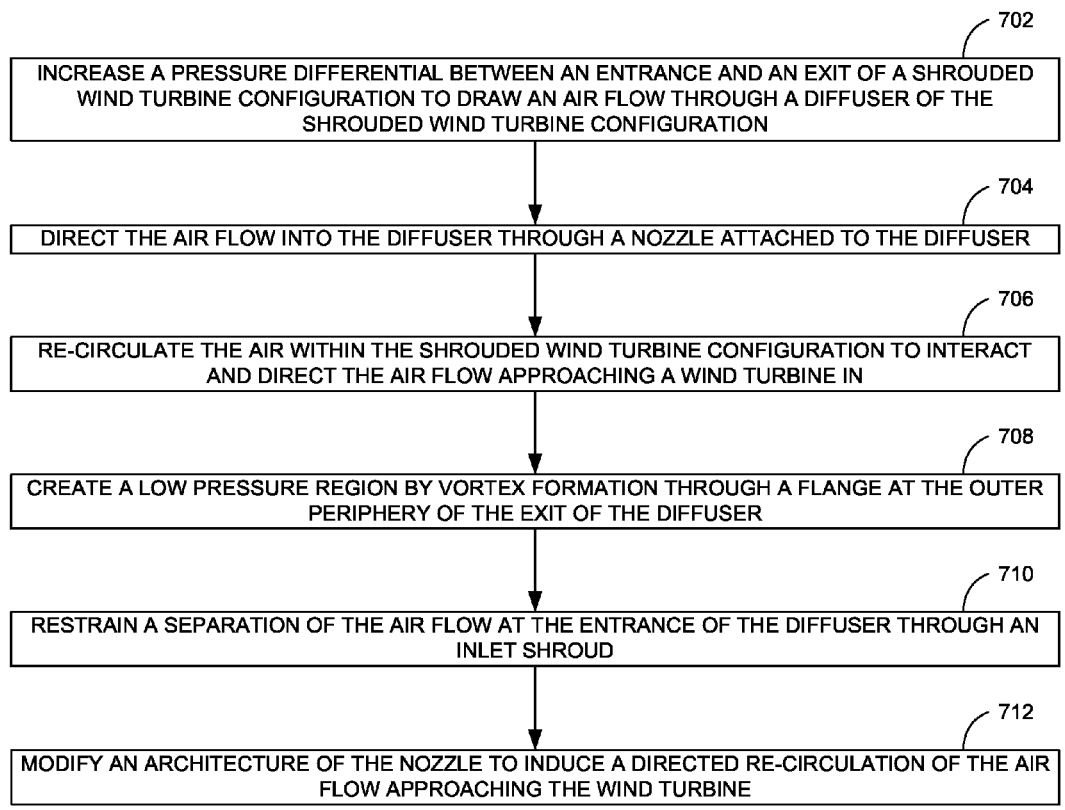
FIG. 7 is a process flow diagram illustrating increasing a pressure differential of a wind turbine, according to one or more embodiments.

FIG. 7 is process flow illustrating increasing the pressure differential of the wind turbine, according to one or more embodiments. In one or more embodiments, in operation 702, the pressure differential between an entrance and an exit of the shrouded wind turbine configuration may be increased to draw the air flow through the diffuser of the shrouded wind turbine configuration. In one or more embodiments, in operation 704, the air flow may be directed into the diffuser through the nozzle attached to the diffuser. In one or more embodiments, in operation 706, the air within the shrouded wind turbine configuration may be re-circulated to increase the wind speed of the air flow approaching the wind turbine in the diffuser.

In one or more embodiments, in operation 708, the low pressure region may be created by vortex formation through a flange at the outer periphery of the exit of the diffuser. In one or more embodiments, in operation 710, a separation of the air flow at the entrance of the diffuser may be restrained through an inlet shroud. In one or more embodiments, in operation 712, the architecture of the nozzle may be modified to induce the directed recirculation of the air flow approaching the wind turbine.

In an example embodiment, the shrouded wind turbine configuration may include a duct having an air inlet at high pressure end and an air outlet at a second end that is closer to the low pressure region, the duct further having a convergent nozzle part defining a converging airflow passage extending from the air inlet toward the air outlet, and a divergent diffuser part contiguous with the nozzle part and defining a divergent airflow passage extending contiguously from a downstream end of the convergent airflow passage to the air outlet. Further, a rotary shaft such as a turbine blade may be rotatably supported in the duct by a support member extending from an inner surface of the duct. A rotor may be attached to the rotary shaft. An electric generator may be driven by rotation of the rotor. And, external energy-addition means may be disposed in the diffuser for exerting an external energy to a stream of air flowing downstream of the rotor. The external energy-adding means may include a heating device. The heating device may be a heat pump, an electric heater, a heat pump and/or a heat exchanger.

In a example embodiment, the heating device may provide external energy-addition means. The air as it flows along the diffuser 104 may be heated so that the air inside the diffuser recovers its initial pressure (inflow pressure) before it reaches the low pressure region end of the diffuser 104. Therefore, increasing the velocity of air flowing into the shrouded wind turbine configuration may lead high speed rotation of the turbine blade 110 with a resulting increase in power output of the shrouded wind turbine configuration.

In one or more embodiments, the heating device may be replaced by a compressor. In one or more embodiments, use of the compressor may increase the pressure differential inside the shrouded wind turbine configuration.

In one or more embodiments, the initial pressure loss may be recovered through the diffuser 104. In one or more embodiments, the initial pressure that may be lost due to wake may be recovered through the diffuser 104 and/or slits in the diffuser that are formed by the adjacent wing elements that form the diffuser 104.

In an example embodiment, shrouded wind turbine configuration may have a duct that surrounds the wind turbine blades 110 and increases in cross-sectional area in the air flow 106 direction. The resulting sub-atmospheric pressure within the diffuser 104 may draw more air through the blade plane, and hence more power can be generated compared to a "bare turbine" of the same rotor blade diameter.

In one or more embodiments, the arrangements so far described, may be used advantageously as a small-sized wind turbine configurations that can be installed independent from the commercial power supply.

In one or more embodiments, the diffuser nozzle augmented wind turbines may offer additional advantages in addition to increased augmentation, including minimal tip speed losses, a small rotor diameter that increases RPM, and being way less sensitive than the traditional wind turbines.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
attaching an end of a nozzle with a streamlined opening to an end of a diffuser such that the nozzle spans at least an entire axial length of the diffuser and subsumes the diffuser therewithin starting from the end of the attachment of the nozzle to the end of the diffuser to direct an air flow through the streamlined opening into a shrouded wind turbine;
attaching the nozzle to a flange of the diffuser to separate a front inlet air space and a back exit air space such that a front cavity is formed in the front inlet air space by an inner side of the nozzle, a front side of the flange and an outer side of the diffuser,
   wherein air collected in the front inlet air space by the nozzle is configured to flow through the shrouded wind turbine in a main thrust of the air flow before exiting through the diffuser to the back exit air space;
inducing directed recirculation of recirculated inlet air in the front inlet air space using the front cavity formed by the inner side of the nozzle, the front side of the flange and the outer side of the diffuser;
controlling a flow pattern of the recirculated inlet air in the front cavity within the front inlet air space using a controlled surface of the front cavity formed by a coordinated shaped inner side of the nozzle, a coordinated shaped front side of the flange and a coordinated shaped outer side of the diffuser;
creating a stagnation point at a tip of the nozzle configured to receive the air flow at an end of the nozzle opposite to the end of the attachment thereof to the end of the diffuser based on sharply curving a surface of the nozzle solely in an immediate vicinity of the tip in comparison to other portions of the surface of the nozzle, the stagnation point rendering the tip of the nozzle susceptible to a peak pressure region with respect to the air flow, an area around the stagnation point being a high pressure region with respect to the air flow, and an area at the end of the diffuser being a low pressure region with respect to the air flow;
increasing an output power generated by the shrouded wind turbine by increasing wind speed of the air flow through reduction of wind friction along a path of the air flow before reaching the shrouded wind turbine;

increasing the wind speed of the air flow by reducing a wind friction between the main thrust of the air flow and the recirculated inlet air in the front cavity along the path of the air flow before reaching the shrouded wind turbine; and reducing the wind friction between the main thrust of the air flow and the recirculated inlet air in the front cavity by controlling at least one of a physical shape, a curvature, and a physical dimension of the controlled surface of the front cavity to direct the flow pattern of the recirculated inlet air in the front cavity such that the recirculated inlet air in the front cavity flows in a parallel manner with the main thrust of the air flow at an interface where the recirculated inlet air in the cavity meets the main thrust of the air flow.

2. A system, comprising:

a shrouded wind turbine with a set of turbine blades to generate electricity based on wind energy as air flows through the shrouded wind turbine;

a diffuser of the shrouded wind turbine to slow down the air flow before the air flow mixes smoothly with atmosphere;

a nozzle with a streamlined opening, an end of which is attached to an end of the diffuser such that the nozzle spans at least an entire axial length of the diffuser and subsumes the diffuser therewithin starting from the end of the attachment of the nozzle to the end of the diffuser to direct the air flow through the streamlined opening into a shrouded wind turbine; and a flange of the diffuser attached to both the diffuser and the nozzle to separate a front inlet air space and a back exit air space such that a front cavity is formed in the front inlet air space by an inner side of the nozzle, a front side of the flange and an outer side of the diffuser, wherein air collected in the front inlet air space by the nozzle is configured to flow through the shrouded wind turbine in a main thrust of the air flow before exiting through the diffuser to the back exit air space, wherein directed recirculation of recirculated inlet air in the front inlet air space is induced using the front cavity formed by the inner side of the nozzle, the front side of the flange and the outer side of the diffuser, wherein a flow pattern of the recirculated inlet air in the front cavity within the front inlet air space is controlled using a controlled surface of the front cavity formed by a coordinated shaped inner side of the nozzle, a coordinated shaped front side of the flange and a coordinated shaped outer side of the diffuser, wherein a stagnation point is created at a tip of the nozzle configured to receive the air flow at an end of the nozzle opposite to the end of the attachment thereof to the end of the diffuser based on sharply curving a surface of the nozzle solely in an immediate vicinity of the tip in comparison to other portions of the surface of the nozzle, the stagnation point rendering the tip of the nozzle susceptible to a peak pressure region with respect to the air flow, an area around the stagnation point being a high pressure region with respect to the air flow, and an area at the end of the diffuser being a low pressure region with respect to the air flow, wherein an output power generated by the shrouded wind turbine is increased by increasing wind speed of the air flow through reduction of wind friction along a path of the air flow before reaching the shrouded wind turbine, wherein the wind speed of the air flow is increased by reducing a wind friction between the main thrust of the air flow and the recirculated inlet air in the front cavity along the path of the air flow before reaching the shrouded wind turbine, and wherein the wind friction between the main thrust of the air flow and the recirculated inlet air in the front cavity is reduced by controlling at least one of a physical shape, a curvature, and a physical dimension of the controlled surface of the front cavity to direct the flow pattern of the recirculated inlet air in the front cavity such that the recirculated inlet air in the front cavity flows in a parallel manner with the main thrust of the air flow at an interface where the recirculated inlet air in the cavity meets the main thrust of the air flow.

* * * * *